United States Patent
March et al.

(10) Patent No.: US 9,913,771 B2
(45) Date of Patent: *Mar. 13, 2018

(54) LIFTING AND TRANSPORTING DEVICE FOR WHEELED OBJECTS INCLUDING HOSPITAL BEDS

(75) Inventors: Peter Raymond March, Clearview (AU); Kenneth Ian Bell, Clearview (AU)

(73) Assignee: Austech & Design Pty Ltd, Clearview, South Australia (AU)

( * ) Notice: Subject to any disclaimer, the term of this patent is extended or adjusted under 35 U.S.C. 154(b) by 294 days.

This patent is subject to a terminal disclaimer.

(21) Appl. No.: 14/126,256

(22) PCT Filed: Jun. 18, 2012

(86) PCT No.: PCT/AU2012/000702
§ 371 (c)(1),
(2), (4) Date: Mar. 17, 2014

(87) PCT Pub. No.: WO2012/171079
PCT Pub. Date: Dec. 20, 2012

(65) Prior Publication Data
US 2014/0186148 A1    Jul. 3, 2014

(30) Foreign Application Priority Data

Jun. 17, 2011 (AU) ................................ 2011902373
Oct. 12, 2011 (AU) ................................ 2011904214

(51) Int. Cl.
*B65G 7/00* (2006.01)
*A61G 7/08* (2006.01)
*B66F 5/04* (2006.01)
*B62B 5/00* (2006.01)
*B62B 3/06* (2006.01)
*B66F 5/00* (2006.01)

(52) U.S. Cl.
CPC .............. *A61G 7/08* (2013.01); *B62B 3/0618* (2013.01); *B62B 5/0079* (2013.01); *B66F 5/00* (2013.01); *B66F 5/04* (2013.01); *B62B 2202/90* (2013.01)

(58) Field of Classification Search
CPC .... A61G 7/08; A61G 2207/80; B62B 5/0083; B62B 2202/90; Y10S 180/904; B64F 1/22; B64F 1/227
USPC .................................. 414/427, 428, 429, 667
See application file for complete search history.

(56) References Cited

U.S. PATENT DOCUMENTS 1,758,550 A   5/1930   Wolters
2,161,659 A   6/1939   Shepard, Jr. et al.
(Continued)

FOREIGN PATENT DOCUMENTS

EP    0765837 A1   2/1997
EP    2039336 A2   3/2009
(Continued)

*Primary Examiner* — Mark C Hageman
(74) *Attorney, Agent, or Firm* — The Webb Law Firm

(57) ABSTRACT

The present invention relates to a lifting and transporting device. The device of the invention is useful for lifting and moving any object which has a pair of spaced apart wheels but is particularly adapted for the lifting and transporting of hospital beds. The bed lifter includes an improved means of engaging a bed and supporting the load of the bed or bed/patient combination during lifting and transportation by engaging the bed wheels and not the bed frame.

16 Claims, 18 Drawing Sheets

(56) References Cited

U.S. PATENT DOCUMENTS

| | | |
|---|---|---|
| 2,359,493 A | 10/1944 | Schreck |
| 2,418,179 A | 4/1947 | Isaac et al. |
| 2,418,279 A | 4/1947 | Sax et al. |
| 2,560,608 A | 7/1951 | Stoner |
| 2,687,190 A | 8/1954 | Hastings, Jr. et al. |
| 2,846,018 A | 8/1958 | Puckett |
| 3,199,910 A | 8/1965 | Bradley |
| 3,265,158 A | 8/1966 | Constable |
| 3,876,024 A | 4/1975 | Shieman et al. |
| 4,997,331 A | 3/1991 | Grinsted et al. |
| 5,110,067 A | 5/1992 | Sinkkonen |
| 5,391,044 A * | 2/1995 | Young ............ B60P 3/125 280/402 |
| 5,511,926 A | 4/1996 | Iles |
| 5,580,207 A | 12/1996 | Kiebooms et al. |
| 5,909,996 A * | 6/1999 | Cowell ............ B60P 3/125 280/402 |
| 6,231,294 B1 * | 5/2001 | Young ............ B60P 3/125 414/480 |
| 6,725,979 B1 | 4/2004 | Snook |
| 6,729,421 B1 | 5/2004 | Gluck et al. |
| 6,871,714 B2 | 3/2005 | Johnson |
| 6,945,354 B2 | 9/2005 | Goff |
| 7,021,407 B2 | 4/2006 | Ruschke et al. |
| 7,500,448 B1 | 3/2009 | Melhorn |
| 7,506,707 B2 | 3/2009 | Trujillo |
| 7,533,742 B2 | 5/2009 | Johnson et al. |
| 7,712,558 B2 | 5/2010 | Helson et al. |
| 8,016,303 B1 | 9/2011 | Ullman et al. |
| 8,016,334 B2 | 9/2011 | Garrett |
| 8,165,718 B2 | 4/2012 | Ota et al. |
| 8,515,594 B2 | 8/2013 | Perry |
| 8,911,194 B1 | 12/2014 | Spinazze |
| 2004/0213656 A1 | 10/2004 | Lear |
| 2006/0045711 A1 | 3/2006 | Schuchardt |
| 2008/0101903 A1 | 5/2008 | Waner et al. |
| 2008/0223649 A1 | 9/2008 | Wandeler |
| 2009/0134374 A1 | 5/2009 | Krug |

FOREIGN PATENT DOCUMENTS

| | | |
|---|---|---|
| NL | 1016924 C2 | 6/2002 |
| WO | 8911893 A1 | 12/1989 |
| WO | 8911983 A1 | 12/1989 |

* cited by examiner

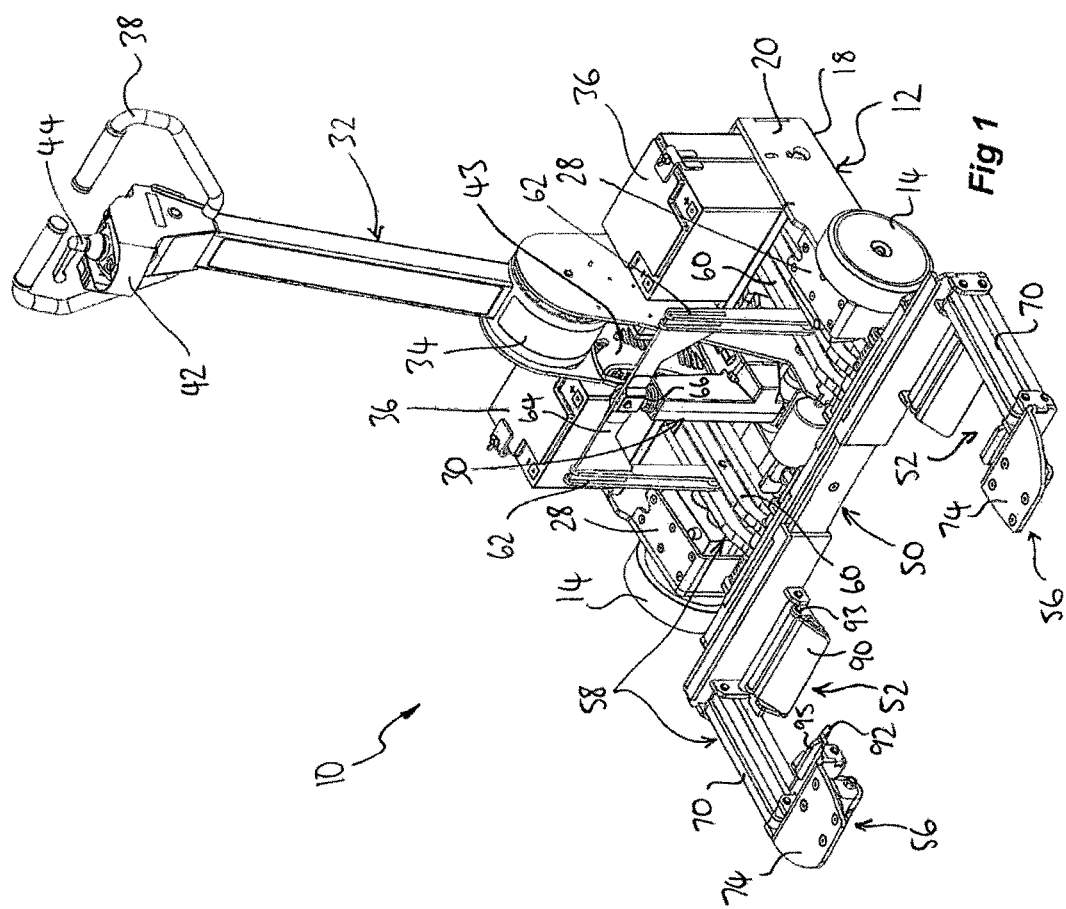

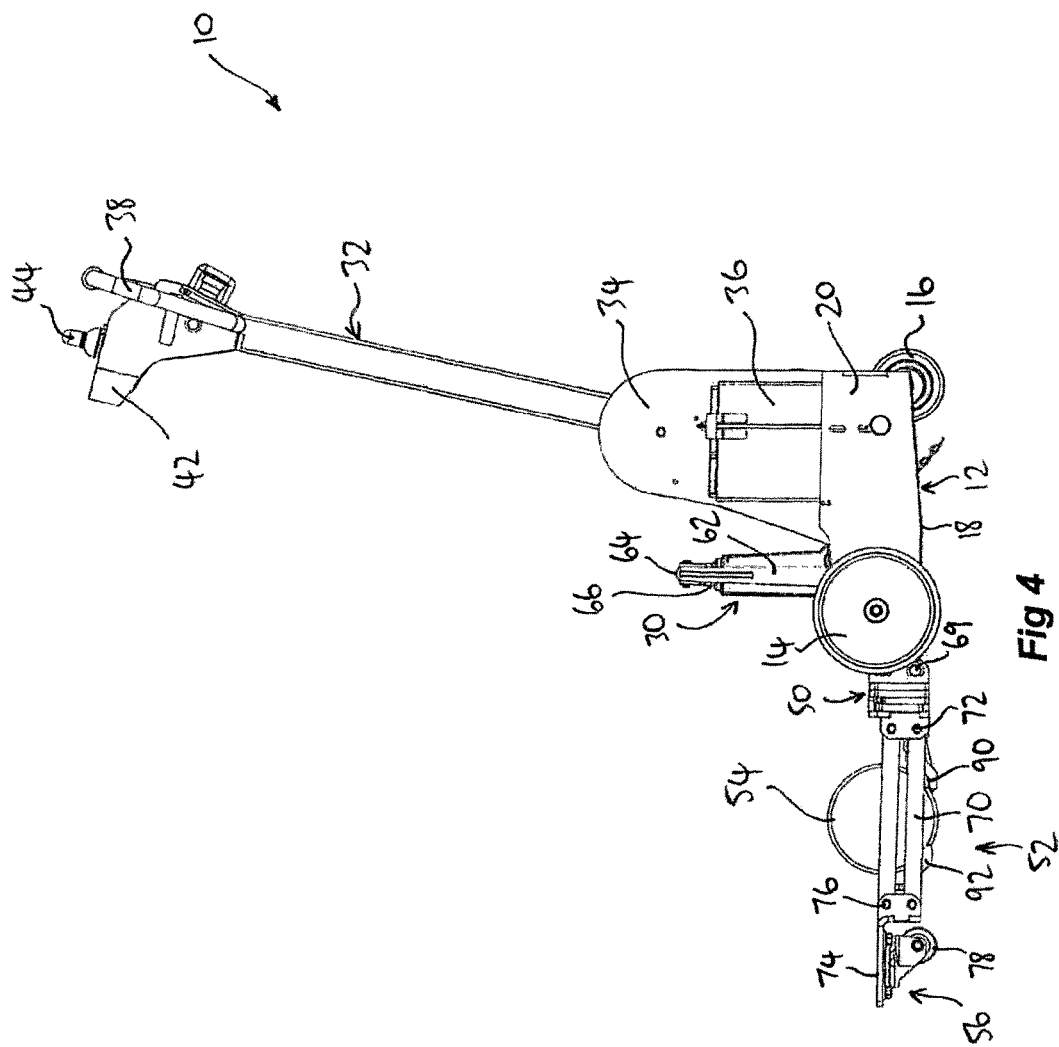

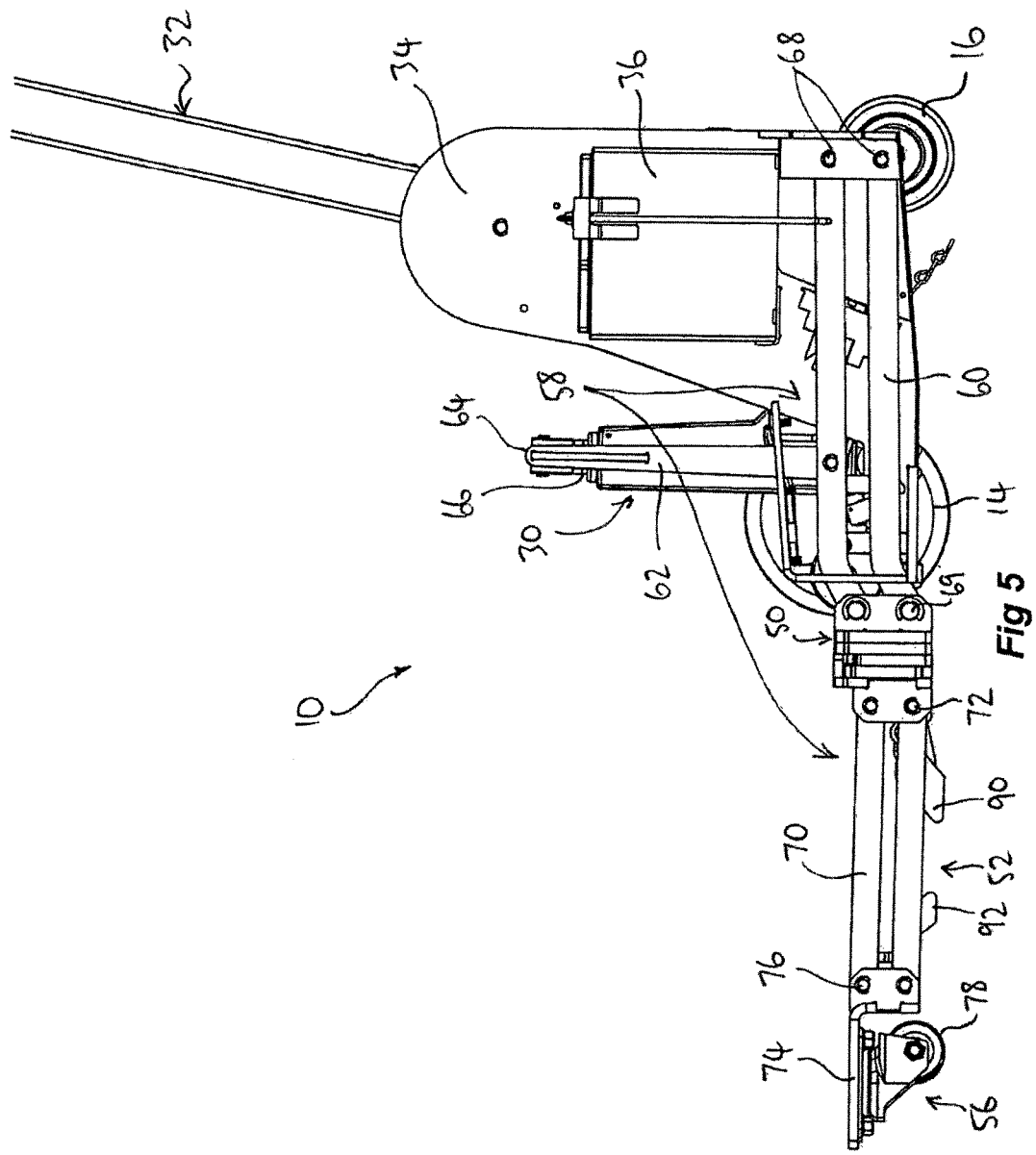

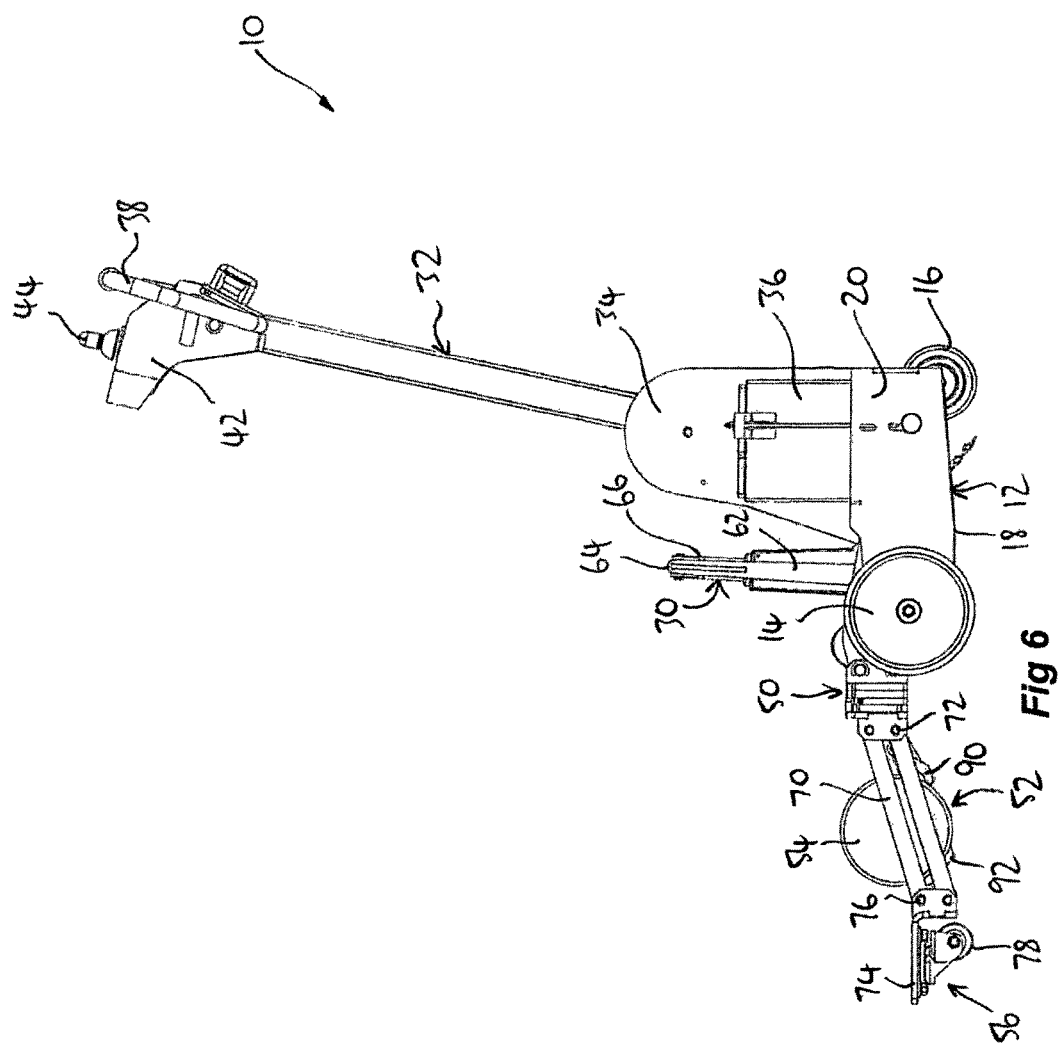

LIFTING AND TRANSPORTING DEVICE FOR WHEELED OBJECTS INCLUDING HOSPITAL BEDS

CROSS-REFERENCE TO RELATED APPLICATIONS

This application is the United States national phase of International Application No. PCT/AU2012/000702 filed Jun. 18, 2012, and claims priority to Australian Patent Application Nos. 2011902373 and 2011904214, filed Jun. 17, 2011 and Oct. 12, 2011, respectively, the disclosures of which are hereby incorporated in their entirety by reference.

FIELD OF THE INVENTION

The present invention relates to a lifting and transporting device. The device of the invention is useful for lifting and moving any object which has a pair of spaced apart wheels but is particularly adapted for the lifting and transporting of hospital beds. The bed lifter includes an improved means of engaging a bed and supporting the load of the bed or bed/patient combination during lifting and transportation by engaging the bed wheels and not the bed frame.

BACKGROUND OF THE INVENTION

A variety of lifting and transportation devices for hospital beds are known. However, most which are known to the Applicant involve the gripping or engagement of a part of the bed frame, which lends itself to problems when dealing with bed frames of different shape and size, and different wheel configurations, orientations, diameters and spaced apart distances.

For example, many prior art jaw mechanisms which serve to grip part of the bed are unable to accommodate frames of different size and shape, or may fail to provide sufficient clearance beneath obstructions such as bed pedals, as well as mid-height obstacles such as bed brake pedals.

Another important consideration is for hospital employees to move the beds in a safe manner that protects their health, the safety of their co-workers and also protects the bed itself which is generally a valuable item.

There is therefore a need for an improved, more universal lifter and transporter of wheeled objects.

It is therefore an object of the present invention to overcome at least some of the aforementioned problems or to provide the public with a useful alternative.

SUMMARY OF THE INVENTION

Therefore in one form of the invention there is proposed a device for lifting an item or part thereof having spaced apart wheels, said device characterised by:
a main body including a first axis extending through a front and rear of said main body;
two wheel engagement attachments associated with said main body and each configured to support a spaced apart wheel of said item during lifting, each attachment being moveable with respect to said body along a second axis which extends substantially perpendicular to said first axis, wherein said engagement occurs when the attachments and wheels are first aligned along said second axis or an axis parallel thereto, and the attachments then moved towards respective wheels until the attachments and wheels are substantially aligned along said first axis or an axis parallel thereto; and
a means of lifting said wheel engagement attachments from a ground surface.

Preferably each wheel engagement attachment is slidably moveable in equal and opposite directions along a guide plate disposed at the front of the main body and extending along said second axis or an axis parallel thereto.

In preference each wheel engagement attachment is adapted to be moved to a greater spaced apart distance than the wheels before being moved inwardly towards the respective wheels for engagement thereof.

Preferably each wheel engagement attachment includes a jaw having at least a forward and rearward wheel abutment surface.

In preference said jaw is open on an inner side thereof for accepting said wheel when moving there towards.

In preference each wheel engagement attachment includes a means of adjusting the distance between said forward and rearward wheel abutment surface to accommodate wheels of different diameter.

Alternatively each wheel engagement attachment is adapted to be disposed between the wheels before being moved in an outwardly direction towards the respective wheels for engagement thereof.

Preferably each wheel engagement attachment is associated with a toothed rack respectively, each rack being in meshed engagement with a driven spur gear associated with said guide plate, whereby rotation of said spur gear in one direction causes the attachments to move away from one another at a constant rate, and rotation in the opposite direction causes the attachments to move toward one another at a constant rate.

In preference when one attachment engages a first wheel before the other, one of said toothed racks stops and thereby causes the spur gear and hence second rack to continue moving towards the engaged jaw until the second wheel is engaged. The rack is thus self-aligning.

Preferably said means of, lifting said wheel engagement attachments from the ground surface includes a means of raising said guide plate vertically from the ground surface.

Alternatively said means of lifting said wheel engagement attachments from the ground surface includes a means of rotating said guide plate in a rearward direction.

Preferably said means of lifting said wheel engagement attachments further includes at least one actuator for effecting said guide plate movement.

In preference said actuator is a hydraulically or electrically power driven actuator.

Preferably said main body includes a frame for supporting at least said means of lifting the wheel engagement attachments.

Preferably said frame is supported above two front drive wheels and a rear steering wheel.

In preference the drive wheels are operated by two electric motors coupled to reduction gear boxes powered by one or more rechargeable batteries.

In preference the two front wheels are load-supporting.

Preferably the device further includes a front castor wheel assembly associated with each of said wheel engagement attachments, the front castor wheel assemblies being load-supporting.

In preference said item is a hospital bed having two front and two rear wheels, said two rear wheels adapted to be lifted by said device to facilitate transportation of the bed.

Preferably said guide plate and lifting means includes a low profile so as not to interfere with low to mid obstructions associated with the item being transported.

DESCRIPTION OF DRAWINGS

The above and other objects, features, and advantages of the present invention will be apparent from the following detailed description of a preferred embodiment in conjunction with the accompanying drawings. In the drawings:

FIG. 1 illustrates a front, top perspective view of a lifting and transporting device in accordance with a first and preferred embodiment of the present invention;

FIG. 4 illustrates a side view of the lifting and transporting device of FIG. 1 with wheels of a bed engaged and the jaw assemblies in their lowered positions;

FIG. 5 illustrates an enlarged side view of the lifting and transporting device of FIG. 1 with some side components removed so that the linkage system is visible;

FIG. 6 illustrates a side view of the lifting and transporting device of FIG. 1 with the wheels of a bed engaged and the jaw assemblies in their raised positions;

DESCRIPTION OF THE PREFERRED EMBODIMENT

Figure 3:
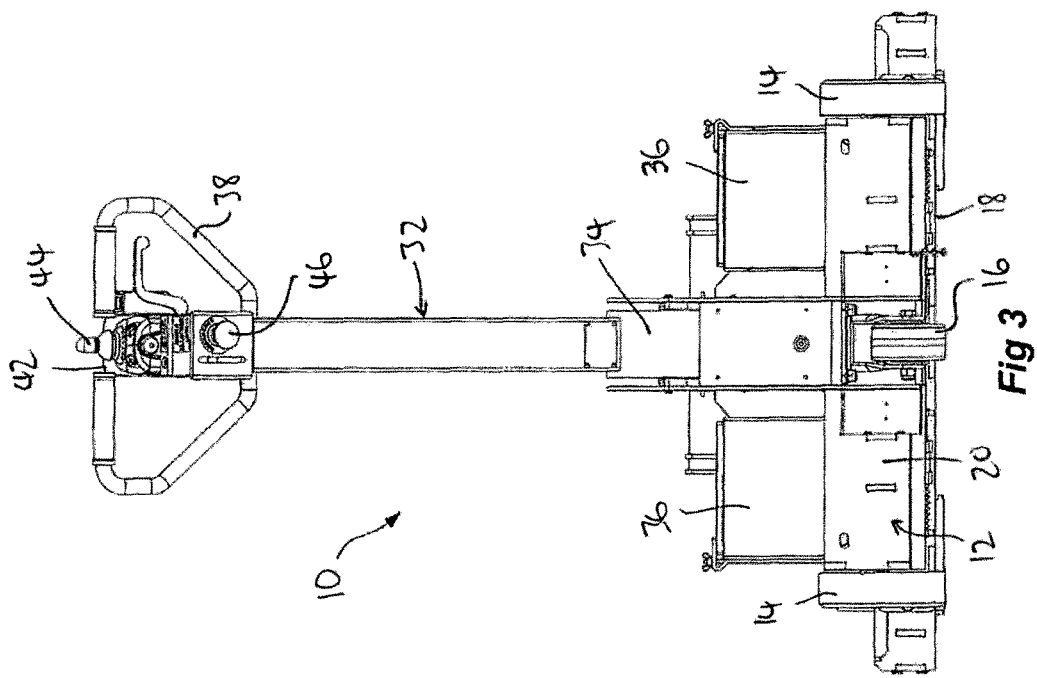
FIG. 3 illustrates a rear view of the lifting and transporting device of FIG. 1.
Figure 2:
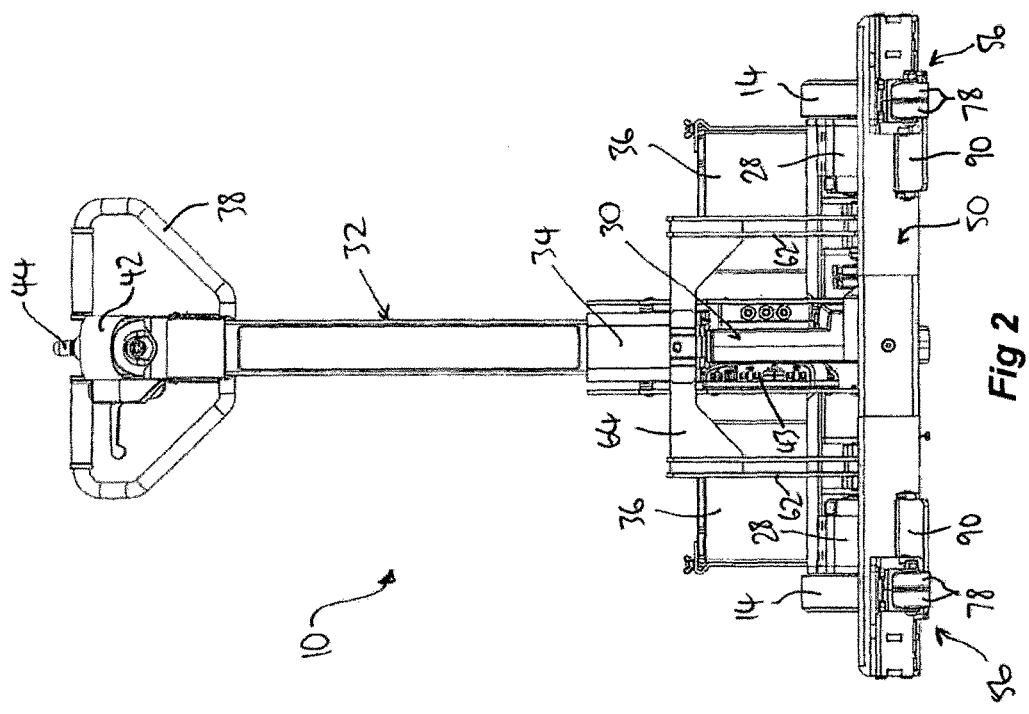
FIG. 2 illustrates a front view of the lifting and transporting device of FIG. 1.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the embodiments and the following description to refer to the same and like parts.

The present invention relates to a lifting and transportation device or bed lifter and, in particular, to a bed lifter including an improved means of engaging wheeled items of different shape and size for lifting and transportation thereof. In particular, the lifter embodied in the present invention is adapted to engage and lift the spaced apart wheels of a bed, and includes engagement means capable of engaging wheels of different dimension, orientation and/or spaced apart distance. The present invention seeks to overcome deficiencies identified in hitherto known bed movers adapted to engage the frames of beds and which are not truly universal in their application.

A bed lifter 10 according to a first and preferred embodiment of the present invention is shown in FIGS. 1-6 and includes a frame 12 on which are mounted two forward wheels 14 and one rearward wheel 16. The frame 12 may be constructed of multiple components, interconnecting portions, and platforms, but for the purpose of brevity it will be referred to herein using a single reference numeral 12.

An important feature of the frame 12 is that it forms a relatively low rise platform for supporting various components, the frame including a base 18 and upright walls 20. The front wheels 14, which are driven wheels, extend along the outside of the upright side walls and serve to locate the frame 12 at the rear (or front) of a bed to be lifted. The front wheels 14 are powered by two motors 28 supported above the frame 12 and positioned inside of the front wheels 14 and extending rearwardly. The rearward wheel 16 is preferably a non-driven castor wheel.

Located centrally above the frame 12 is a linear, vertically mounted actuator 30 which is mounted to the frame at its lower end via a pin (not shown). The upper end of the actuator 30 is thus freely rotatable about the pin. The function of the actuator 30 will be described in further detail below.

A handle assembly 32 is positioned at the rear of the frame 12 and extends down to a spindle 34 which allows for pivotal adjustment of the handle 32 relative to the frame 12, that is, adjustment of the angle at which the handle 32 extends upwardly and rearwardly. The rear castor 16 is suspended just below the spindle 34. On either side of the spindle 34, the frame includes two platforms for supporting a pair of batteries 36. The batteries 36 provide power to the motors 28 and are preferably rechargeable, thereby eliminating the need to have any mains power supplied to the device during operation.

The handle assembly 32 includes handle bars 38 at an upper end thereof for a user to grip when transporting the device 10 and controls therein that operate the motors 28 and the actuator 30. A control unit 42 is also located at the top of the handle 34. The control unit 42 is operatively connected to both the motors 28 (via a programmable power module 43) and the actuator 30. The power module 43 receives input from the control unit 42 and sends the correct amount of power to the relevant wheel motor 28. Control unit 42 thereby allows for variable speed control for forward and backward movement of the device 10.

Forward and backward movement is preferably instigated through lever 44 and there is also preferably a brake 46 which allows the operator to stop the device quickly in an emergency. Electronic control units are available for purchase and an off the shelf item is readily adapted to suit the needs of the present device. Variable speed indicators and controllers may be incorporated into the control unit together with more sophisticated options such as a battery power gauge to display the availability of power from each or a combination of both batteries included in the unit.

Some of the components of the device 10 described above may be applied across all embodiments of the present invention in that they relate generally to the frame configuration and how a user can move and operate the device 10 through manipulation of a lever 42, although other variations are certainly possible as will become apparent.

The following description relates particularly to the components of the device 10 which allow items such as beds to be engaged, lifted and moved, and the load of the item to be appropriately supported to prevent toppling of the device. There is shown at the front of the device a rack 50, two slideable jaw assemblies 52 associated therewith and used to engage the bed wheels 54 in accordance with the present invention, front castor wheel assemblies 56 for assisting the front drive wheels in supporting the load, and a linkage system 58.

Figure 7:
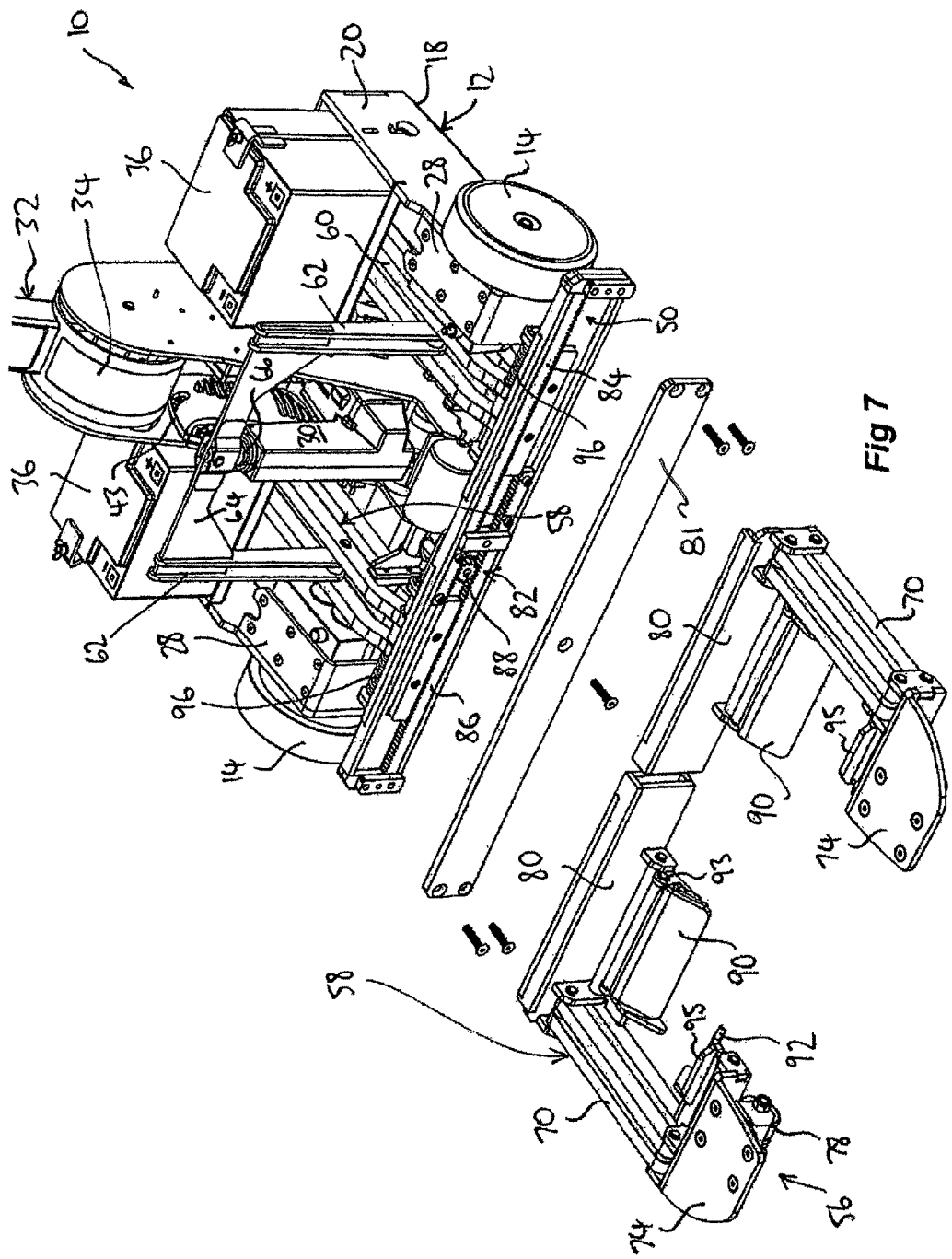
FIG. 7 illustrates an enlarged and partially exploded perspective view of the lifting and transporting device of the present invention, showing the rack and spur gear mechanism which enables movement of each jaw assembly.

The linkage system 58 includes rear parallel linkages 60 on either side of the actuator 30, coupling the rear of the frame 12 with the front rack 50 as shown most clearly in FIGS. 1, 5 and 7. Upright members 62, which are pivotably attached at their lower ends to each parallel linkage 60 at a position closer to the front ends of each linkage 60, are fixed to a transverse cross bar 64 to which the actuator piston 66 is operatively connected.

The skilled addressee would thus realise that operation of the actuator 30 causes the parallel linkages 60 to lift slightly and rotate about their rear pivot points 68. At rest, the actuator 30 assumes a withdrawn position as shown in FIGS. 4-5. As the actuator is operated the piston 66 emerges and acts against the cross bar 64 to thereby raise the upright members 62 to the position shown in FIG. 6. When the upright members are raised, the forward ends of the parallel linkages 60 are also raised and, owing to their pivotable rear connections, the rack 50 is lifted. Each parallel linkage 60 is also pivotably associated with the rack 50 such that rotation occurs about pins 69. This configuration thus ensures the rack 50 and hence bed wheels are lifted a sufficient distance above the ground to enable transportation. Although not shown, coil springs and like components can be used to assist in the various operations.

It will become apparent from a viewing of the additional embodiments that the present invention is not intended to be limited to only the above described means of raising the wheels from the ground.

FIG. 6 shows the rack 50 in its raised position, and it can be appreciated that the bed wheels 54 need only be lifted a short distance above the ground in order for the device 10 to be used to transport the item being shifted while the castor wheels 78 remain on the ground.

The linkage system 58 further includes front parallel linkages 70 which, together with the jaw assemblies 52 and front castor wheel assemblies 56, are slidably mounted to the rack 30. Each slideable linkage 70 extends forwardly from the rack and is also pivotably connected thereto about rack pivot points 72. At their forward end, each linkage 70 is also pivotably coupled to the horizontal mounting surface 74 of each castor wheel assembly 56 about a castor pivot point 76. The linkage 70, jaw assembly 52 and castor wheel assembly 56 on left and right hand sides of the rack 50 are thus slideable towards and away from each other. Support for the item being lifted by the jaw assemblies is thus provided by both the front drive wheels 14 and the additional castor wheel assemblies 56 disposed forwardly thereof and connected to rack 50 via linkages 70.

Individual members forming part of each linkage have not been explicitly described herein for brevity, but it's to be understood that where it is stated that a parallel linkage includes a pivotable connection, both members of the linkage are pivotably connected. For example, each linkage 60 extending between the rack 50 and the rear part of the frame 12 includes two vertically disposed members which are both pivotably connected to the respective components at ends thereof.

The reader would now appreciate how the lifting and transportation device of the preferred embodiment is able to lift (after the item has been engaged, as described in more detail below) and support the load of an item being transported. Once the wheels of an item are engaged by the jaw assemblies 52, the actuator 30 is operated such that its piston 66 raises and lifts cross bar 64, thereby raising the parallel linkages 60 and front rack 50. In turn, the rear ends of the forward parallel linkages 70 are raised, and owing to their pivotable connections at both their front and rear ends, the front castor assemblies 56 with castor wheels 78 are pulled slightly rearwardly but are maintained in their grounded positions. As shown perhaps most clearly in the front view of FIG. 3, each castor wheel assembly 56 includes a pair of laterally spaced apart castor wheels 78 which ensures further stability.

The addition of the front castor wheel assemblies 56 and the associated linkage system ensures that load is distributed more efficiently and prevents toppling of the device under heavy loads. An issue which has been recognised in the prior art relates to the potential for such lifting devices to topple forwards when the load of a bed and patient combination is significant. The addition of the front castor wheels and linkage system serves to address these issues. The linkage configuration further ensures that the horizontal mounting surface 74 of each castor assembly remains parallel with the ground through the whole range of linkage movement, meaning the wheels 76 are free to rotate about their axes, friction is reduced, and there is no additional load placed on the drive motors.

The fact that the rack 50 is located so close to the ground, which in the embodiment shown is achieved by the parallel linkages 60 including a downward extension at their front ends, further ensures that there is sufficient clearance above the rack 50 for components of the item being lifted. For example, when transporting hospital beds, bed brake pedals extend rearwardly and have often interfered with movement of ballasts and the like associated with prior art bed lifters.

The reader's attention is now drawn to the main feature of the present invention, present across all the embodiments discussed herein, being the improved manner in which the device 10 engages the wheels of an object to be transported.

As mentioned earlier, the jaw assemblies 52, front parallel linkages 70 and front castor wheel assemblies 56 are inwardly and outwardly slideable alone the rack 50 so that wheels of an item being lifted may be engaged by the jaw assemblies. Each of these components is attached, or pivotably attached in the case of the front parallel linkages 70, to a respective moveable housing 80. FIG. 7 illustrates most clearly the gear mechanism 82 inside the rack 50 with which each housing 80 is associated through a guide plate 81 to effect movement of the components attached thereto. In particular, there is shown an upper toothed rack 84 which is connected to the right hand side housing 80 and a lower toothed rack 86 which is connected to the left hand side housing 80. Both of the toothed racks 84 and 86 are driven by a single spur gear or pinion 88 which is rotatable by a further motor (not shown), and which is associate with the rack 50 such that movement of the spur gear in a left or right direction will cause corresponding movement of the entire rack 50. For present purposes, the left hand side is taken to be the left side of the device from the perspective of an operator of the device facing forwards.

Figure 8:
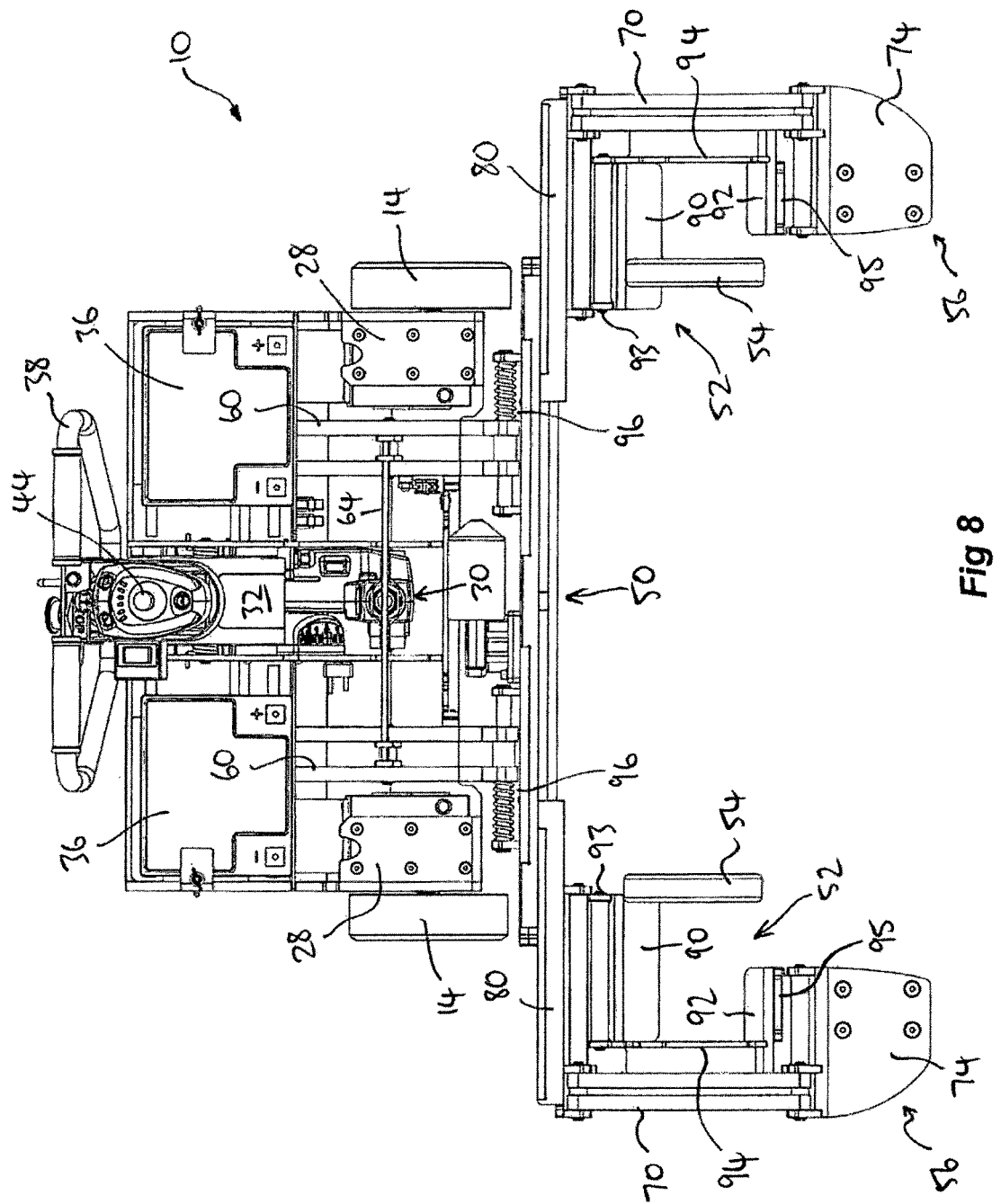
FIG. 8 illustrates a top view of the lifting and transporting device of FIG. 1 with jaw assemblies positioned in an outer position and bed wheels having a centreline that is misaligned with the device.
Figure 9:
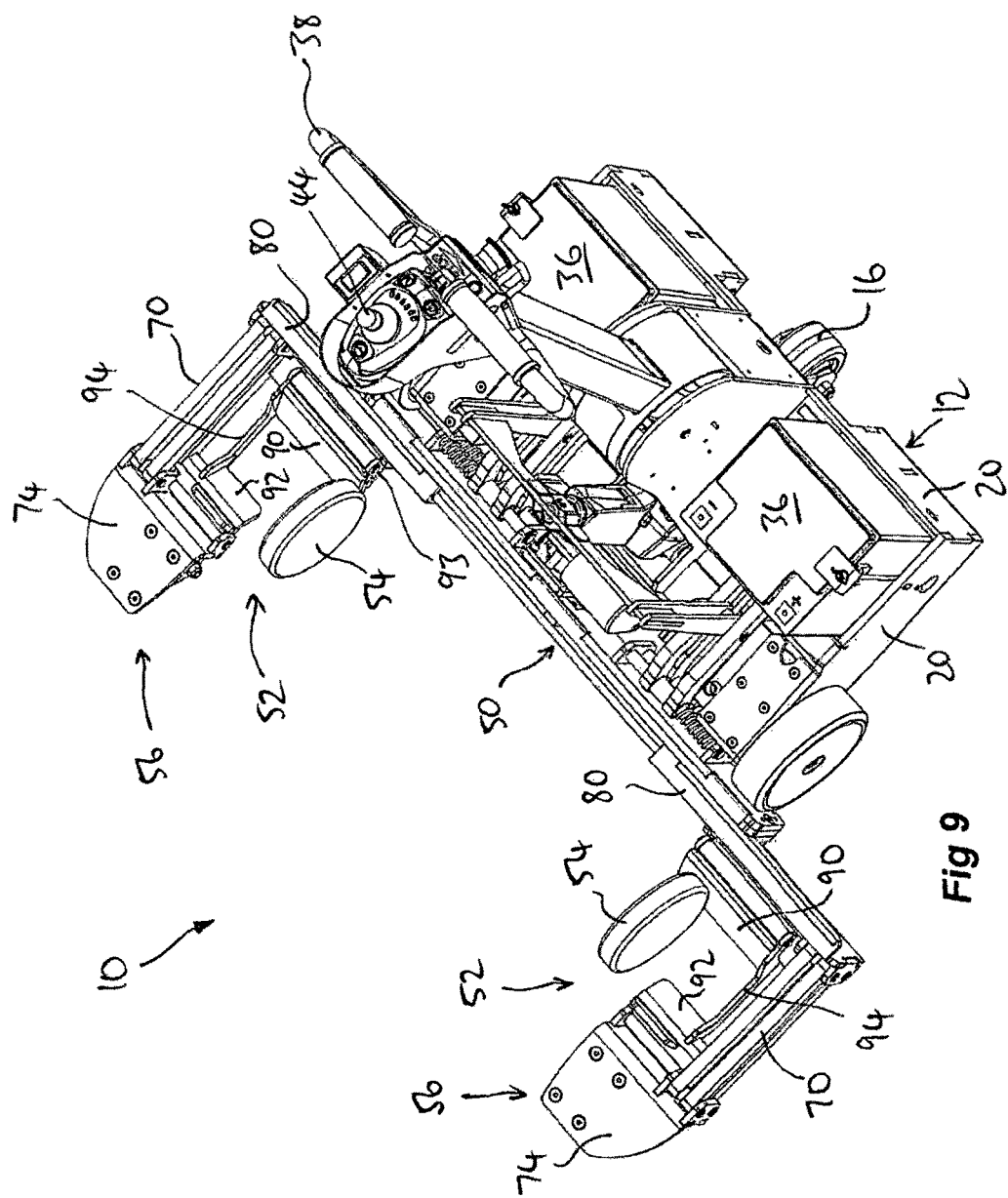
FIG. 9 illustrates a top, rear perspective view of the lifting and transporting device in the configuration shown in FIG. 8.

FIGS. 8 and 9 show the device 10 after each housing 80 and hence each jaw assembly 52 has been shifted to an outer position ready to engage the wheels of a bed, such movement resulting from the actuation of the spur gear motor (not shown) which rotates the spur gear 88. Rotation of the spur gear in one direction causes the upper and lower toothed racks 84 and 86 to move outwardly, by way of meshed engagement with the spur gear, and inwardly when the gear 88 is rotated in the opposite direction. The present invention is not intended to be limited to any one direction of rotation to cause movement of the jaw assemblies in one direction or the other.

Therefore, the central gear 88 drives each toothed rack and therefore each housing 80 and jaw and castor assembly associated therewith at the same time in opposite directions and at a constant rate.

The next step is that the device 10 must be moved to the bed to be lifted and positioned such that the wheels 54 of the bed are located between the jaw assemblies 52 as shown in FIGS. 8 and 9. Once in position, the spur gear motor can be actuated again but in the opposite direction to cause each toothed rack and associated housing to move inwardly. In the embodiment shown, each jaw assembly is made up of a rear ramp 90 extending forwardly from housing 80 and a front opposed ramp 92 extending rearwardly from the castor wheel assembly 56, the front and rear ramps being spaced apart and configured according to the item being moved.

For most conventional hospital beds for example, there is a standard wheel diameter, and so for this application the distance between the ramps and also the length of the front linkages 70 would be constructed accordingly. However, configurations which allow for the jaw assemblies to be adjusted to suit other wheel diameters are also considered to be within the scope of the present invention. In the embodiment shown for example, each rear ramp 90 is rearwardly pivotable about a pin 93 to a position in which the surface beneath each rear ramp 90 would form the contact surface for the wheel 54. The skilled addressee would realise that this would allow for larger diameter wheels.

The rear ramps 90 extend inwardly a greater distance than the front ramps 92. This is to allow the device to be wheeled to a bed, and for the jaw assemblies to be moved outwardly a sufficient distance such that device can then be moved forwards, that is, until the bed wheels 54 and rear ramps 90 make contact. Then, each jaw assembly is adapted to be moved inwardly and close in on the wheels until each wheel 54 is located above the opposed front and rear ramps of each assembly.

In a preferred aspect, the device 10 includes a means of ensuring that each wheel is appropriately engaged by the jaws even if one wheel is oriented differently to the other wheel. This will ensure that each wheel 54 is located above the opposed front and rear ramps of each jaw assembly in a straight configuration prior to lifting, that is, parallel with the centreline of the device.

Figure 10:
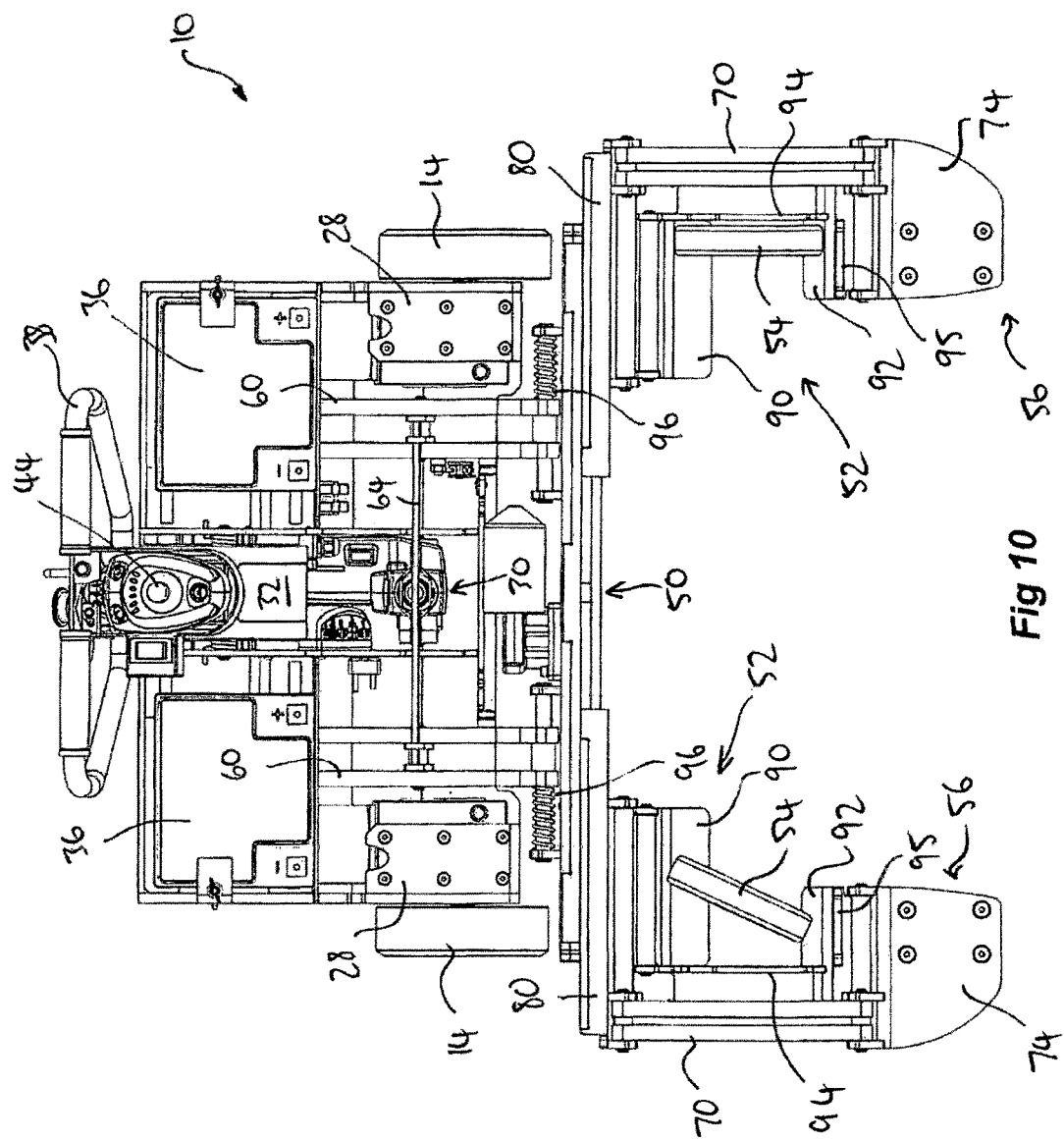
FIG. 10 illustrates a top view of the lifting and transporting device after the jaw assemblies have been shifted inwardly and the LHS jaw assembly has engaged the left wheel.
Figure 11:
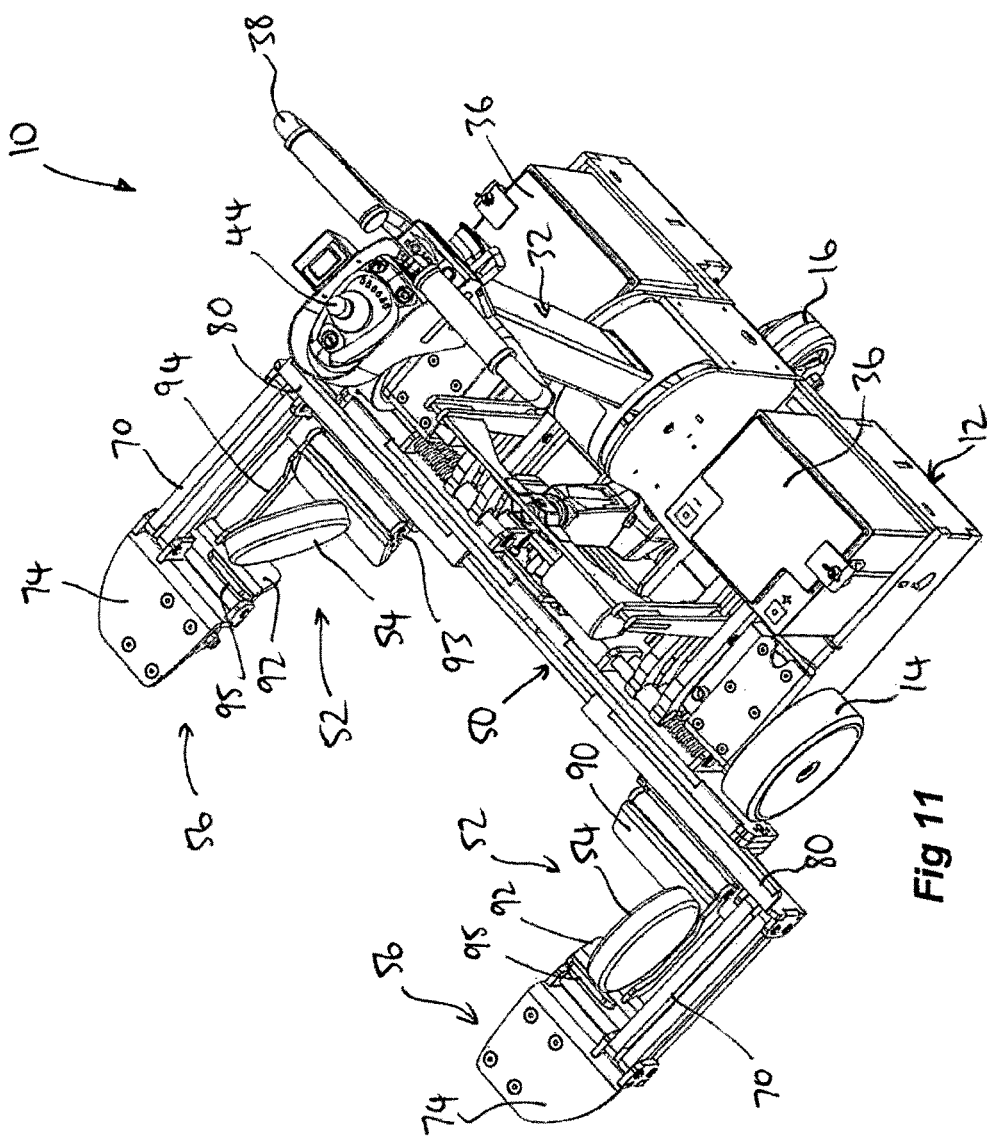
FIG. 11 illustrates a top, rear perspective view of the lifting and transporting device in the configuration shown in FIG. 10.

Each jaw assembly 52 includes an outer wall 94 (shown only in FIGS. 8-13) which ensures proper alignment of the wheels 54 as the jaws close in on the wheels. FIGS. 10 and 11 show an example of where a wheel 54 may be misaligned or angled. The jaw assemblies 52 of the present invention ensure that such misaligned wheels will straighten prior to lifting by way of contact with the outer walls 94 as each jaw assembly moves inwardly.

An upright bumper 95 is also present above each front ramp 92 of the jaw assemblies. The function of the bumper 95 is to ensure that the bed wheels 54 do not roll forwards during transportation of the bed or wheeled item, something which has been known to occur during particular movements. It is to be understood that the bumper 95 could be of an alternate configuration to that which is shown, for example, it could extend higher or at a different angle if need be, or could include a pivotable or slideable extension (not shown) to enable it to bridge any gaps that may exist between itself and the wheel 54.

There will be times where the item being moved and the device 10 are misaligned, for example, when an operator has not positioned the device 10 on the exact centreline of the item. This would normally result in one jaw assembly reaching a castor wheel before the other, as shown in FIGS. 10 and 11. The jaw assemblies will only stop sliding inwardly when either one contacts the endstop of the rack or the wheels of the bed to be lifted.

Therefore, in the example shown, when the left hand side jaw assembly 52 stops after making contact with the left hand side bed wheel, the lower toothed rack 86 also stops moving. The spur gear 88, while previously rotating in a stationery position, is thereby forced to rotate along the lower toothed rack 86 towards the left side. In doing so, the right hand jaw assembly continues to move inwardly, and the rack 50 itself moves towards the left side as a result of leftward movement of the spur gear. In other words, the jaw which connects with the bed wheel first pulls the rack 50 sideways until the second jaw connects with the opposite bed wheel. This movement continues until the second bed wheel is engaged, as shown in FIGS. 12 and 13.

Figure 12:
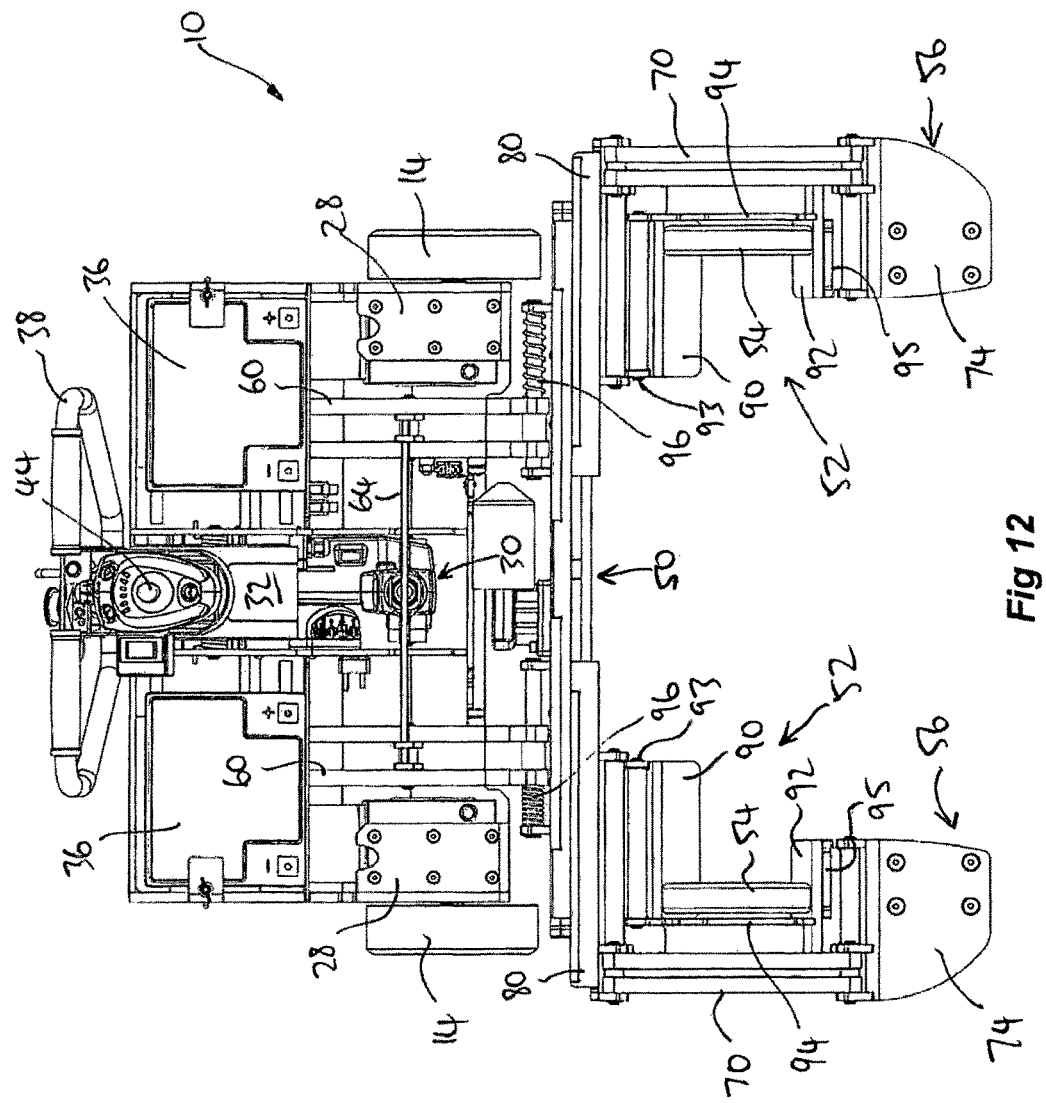
FIG. 12 illustrates a top view of the lifting and transporting device after the LHS jaw assembly has pulled the rack sideways and the RHS jaw assembly has engaged the right wheel.
Figure 13:
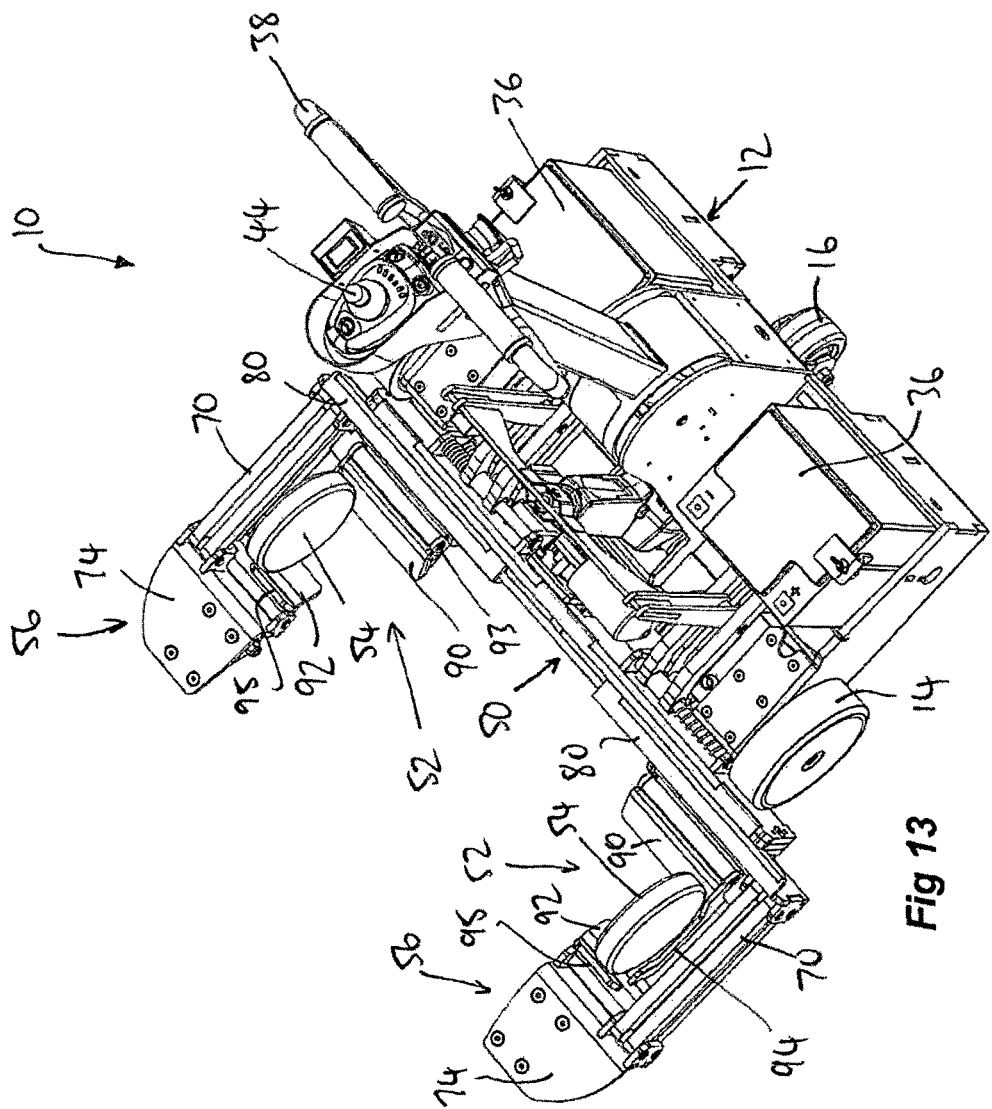
FIG. 13 illustrates a top, rear perspective view of the lifting and transporting device in the configuration shown in FIG. 12.

The top views of FIGS. 8, 10 and 12 show most clearly the components at the rear of the rack 50 which allow its position to be moveable and therefore self-aligning as described above. In particular, the rack 50 is supported by two or more spring loaded pistons 96 disposed at front ends of the parallel linkage 60 and which extend parallel with the rack 50. The pistons are spring loaded such that the rack 50 is biased in a central position and movement to the left or right will be met with some resistance from the springs. The rack 50 can be shifted with respect to the frame in either transverse direction, for example, in the abovementioned circumstances. It can be clearly seen in FIGS. 12 and 13 that the spring on the right hand side has been compressed after the rack 50 has been forced to shift to the left.

It should also now be apparent to the reader how the wheels of different diameter, orientation and spaced apart distance can be engaged by the device 10 of the present invention, and how rack 50 of the present invention is self-aligning and may thus compensate for potential misalignment between the device 10 and the item being lifted and transported. The present invention thus provides for a truly universal bed lifter ands transporter.

Once the jaw assemblies have engaged the wheels, the actuator 30 can then be operated to drive the linkage system 58 and thereby lift the wheels. As described earlier, each castor wheel assembly 56 remains grounded during the lifting process, and hence so do the front ramps 92. Lifting of the wheels 54 is achieved by lifting of the rack 50 and hence the rear ramps 90 only. Although, other configurations are possible, as will become apparent.

Once a bed or similar wheeled item has been transported, the wheels can be lowered by operating the actuator 30 again, and then operating the spur gear motor in the opposite direction until the jaw assemblies have moved outwardly a sufficient distance to allow the device to be reversed away from the bed. As the spur gear and hence rack 50 moves back towards the right hand side, the compressed spring extends and re-centres the rack 50. In preference, actuation of the spur gear motor is also controllable from the handle 38, for example, also using the control unit 42 and lever 44.

It is to be understood that the front wheels 14 and the front castor wheel assemblies 56 principally take the load of the bed. Thus, the rear castor wheel 16 is relatively free and can swivel allowing controlled movement of the bed even in confined spaces. The two powered driven wheels are preferably independently powered to effect steering of the machine and bed combination.

Figure 14:
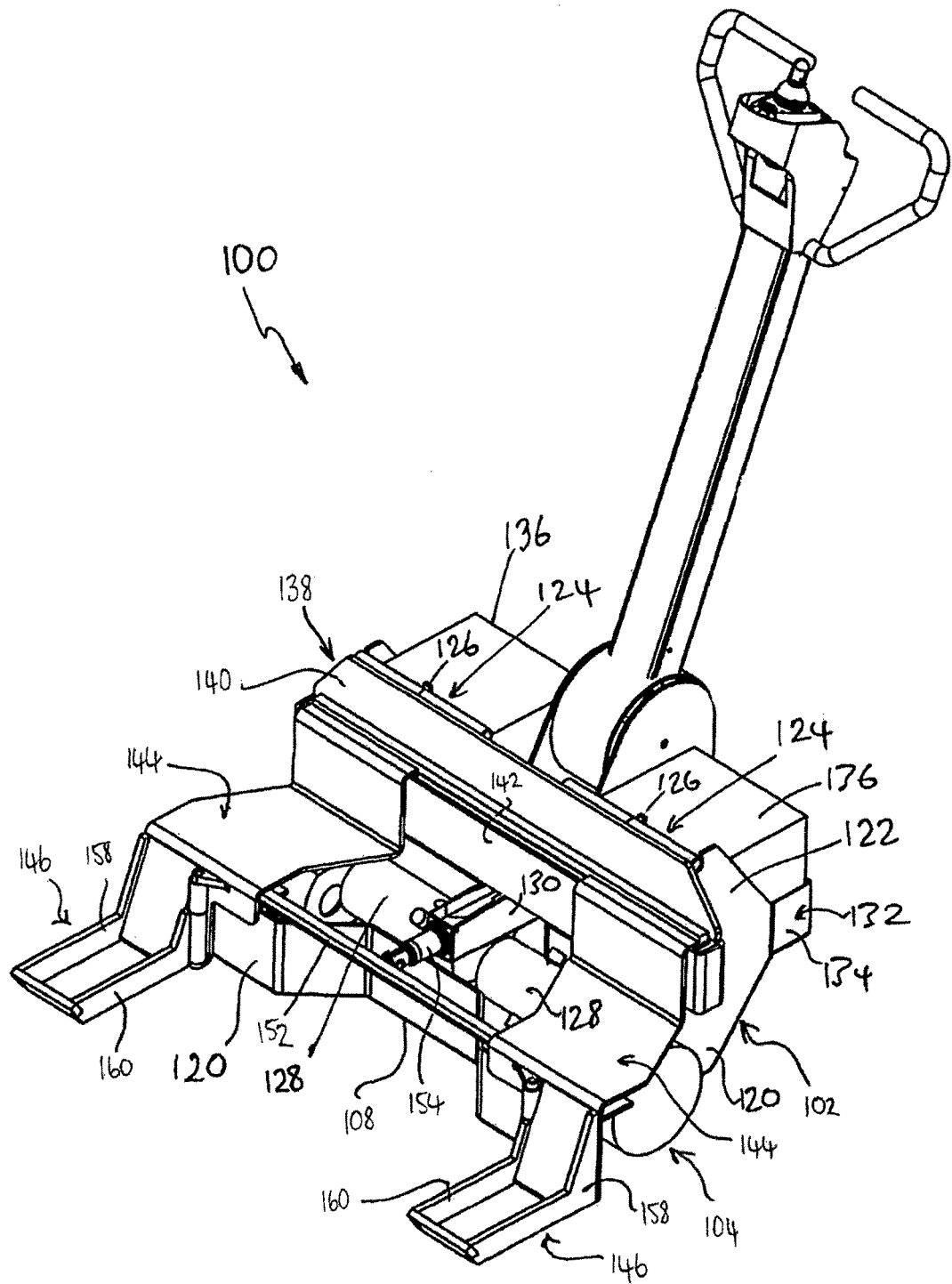
FIG. 14 illustrates a front, top perspective view of a lifting and transporting device in accordance with a second embodiment of the present invention.

FIG. 14 shows an example of a bed mover 100 according to a second, more simplified embodiment of the present invention. In particular, the bed mover 100 does not include front load-supporting castors (and hence may be suitable for transporting lighter items), and has an alternate engaging/lifting mechanism to that previously described. However, device 100 falls within the scope of the invention in that it includes transversely movable jaws adapted to engage the spaced apart wheels of an item. Parts which are similar or identical with unit 10 of the first embodiment will not be described again.

As per the first embodiment, the mover 100 includes a frame 102 on which are mounted two forward wheels 104 and one rearward wheel 106, a base 108 and upright side walls 120. The front wheels 104 extend along the outside of upright side walls 120 which also include upstanding fins 122 whose purpose is to support the ends of two inwardly directed hinge mechanisms 124. The two hinge mechanisms 124 are further supported by support members 126 associated with the frame 102.

The forward wheels 104 are drive wheels and also serve to locate the frame 102 at the rear of a bed to be lifted. The forward wheels 104 are powered by drive means in the form of two motors 128 supported above the frame 102 between the drive wheels 104. The rearward wheel 106 is a castor located below the frame 102.

Located centrally and immediately above the two motors 128 is a linear actuator 130 which is preferably secured at a rear end thereof by means of a pin (not shown). The front end of the actuator 130 is freely rotatable about the pin. Behind the actuator 130 and extending rearward from the rear upright wall of the frame are two platforms 132. The platforms 132 include shallow upright walls 134 which together with side fins 122 serve to locate and position a pair of batteries 136 thereon.

The engaging/lifting attachment 138 of unit 100 includes an elongate plate 140 extending across the front of the device and is pivotably connected to the frame 102 along an upper edge thereof via the hinge mechanisms 124. Extending along the bottom of the plate 140 is a guide 142 which allows for slideable motion of two spaced apart rail assemblies 144 to which are fixed mechanically operated jaws 146 responsible for engaging bed wheels 148. Each rail assembly is transversely moveable along guide 142.

Each rail assembly 144 extends forwardly from the plate 140 to a position beyond the frame 102 and wheels 104 where they are supported by and again slideable along a connecting rod 152 extending parallel with plate 140. Each jaw 146 then extends still further forwards from their respective rail assemblies 144 such that a lower limb of each jaw is generally level with the ground surface ready for engaging the bed wheels.

Figure 15A:
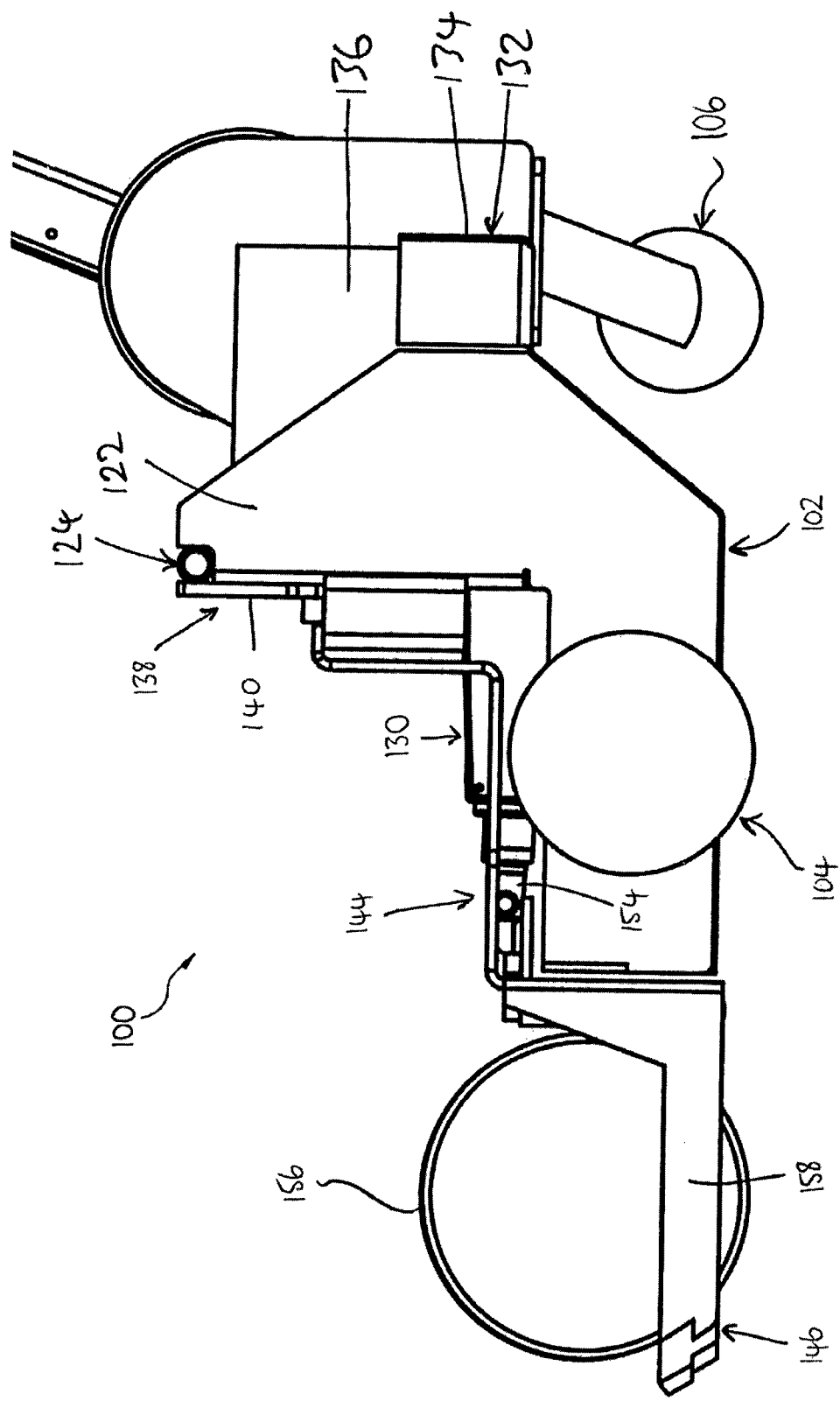
FIG. 15a illustrates a side view of the lifting and transporting device of FIG. 14 with wheels of a bed engaged and the jaw assemblies in their lowered positions.

The actuator 130 includes a piston 154 which at its forward end is pivotably connected to the connecting rod 152. At rest, the actuator 130 assumes a withdrawn position as shown in FIG. 15a. In this position the actuator 130 extends almost horizontally and the jaws are positioned adjacent the ground as described earlier. As the actuator is operated the piston 154 emerges and acts against the connecting rod 152 to thereby raise the entire engaging/lifting attachment 138 including plate 140, rail assemblies 144, jaws 146, and the bed wheels 148 engaged by the jaws 146.

Figure 15B:
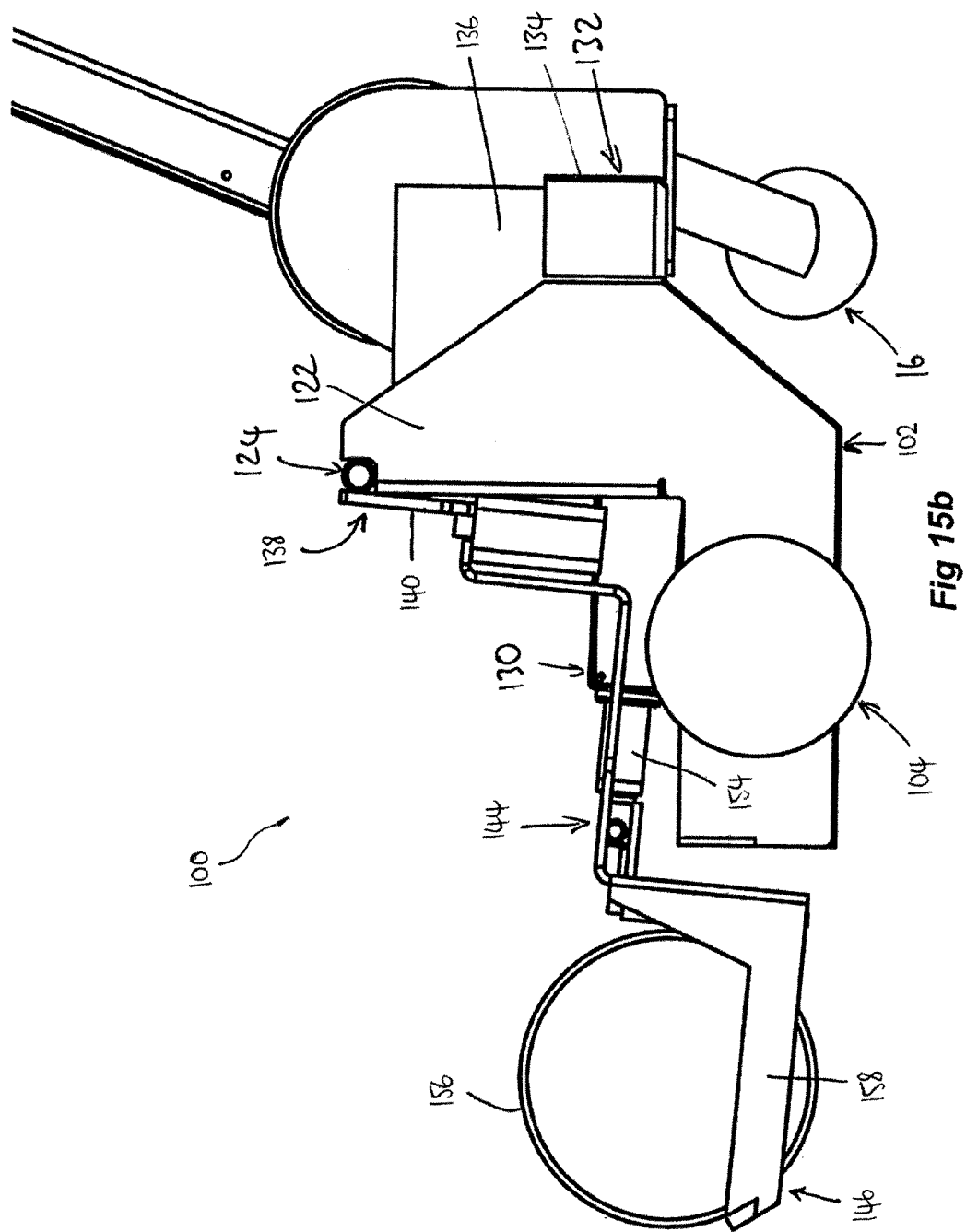
FIG. 15b illustrates a side view of the lifting and transporting device of FIG. 14 with the wheels of a bed engaged and the jaw assemblies in their raised positions.

The raised position of the attachment 138 is shown in FIG. 15b where it can also be seen that the actuator 130 itself has rotated upwardly in the process. As the position of the wheel engaging jaws 146 have been rotated upwardly so too have the rear wheels 156 of the bed which are thus now supported off the ground for movement.

The jaw mechanisms are configured differently to the first embodiment, one difference being that they each include a means of locking in the wheel and the ramps. Each jaw 146 is in the form of a cradle-like structure including an outermost, generally right angled bracket 158 and an innermost, generally right angled bracket 160 that is pivotably connected at its rearward end to the outermost bracket 158 and thus moveable with respect thereto. The skilled addressee would realise that the innermost bracket 160 is effectively a gate which can be swung open to allow for each wheel to enter the jaws when actuated to close in on the wheels, and then locked again to bracket 158 once the wheel is in place. The adjustability of each rail assembly 144 along the guide 142 was described earlier and the skilled addressee would appreciate that it is this adjustability which allows for wheels of variable spaced apart distances to all be engageable by device 100.

Thus, in practice, the devices 10 and 100 can be wheeled to the rear of a hospital bed, the jaws then adjusted to a greater spaced apart distance than the wheels (which could differ from bed to bed), and the jaws then actuated to close in on the wheels. The second embodiment involves the additional step of then shutting closed the bracket to lock in the wheels. Then, upon operation of the actuator 30 or 130 as described earlier, both bed wheels are effectively lifted off the ground. While not described above, slideable movement of each rail assembly 144 along guide 142 in the second embodiment, as well as opening and closing of the innermost brackets 160, is preferably controllable from the device's handle, control unit and lever.

Figure 16:
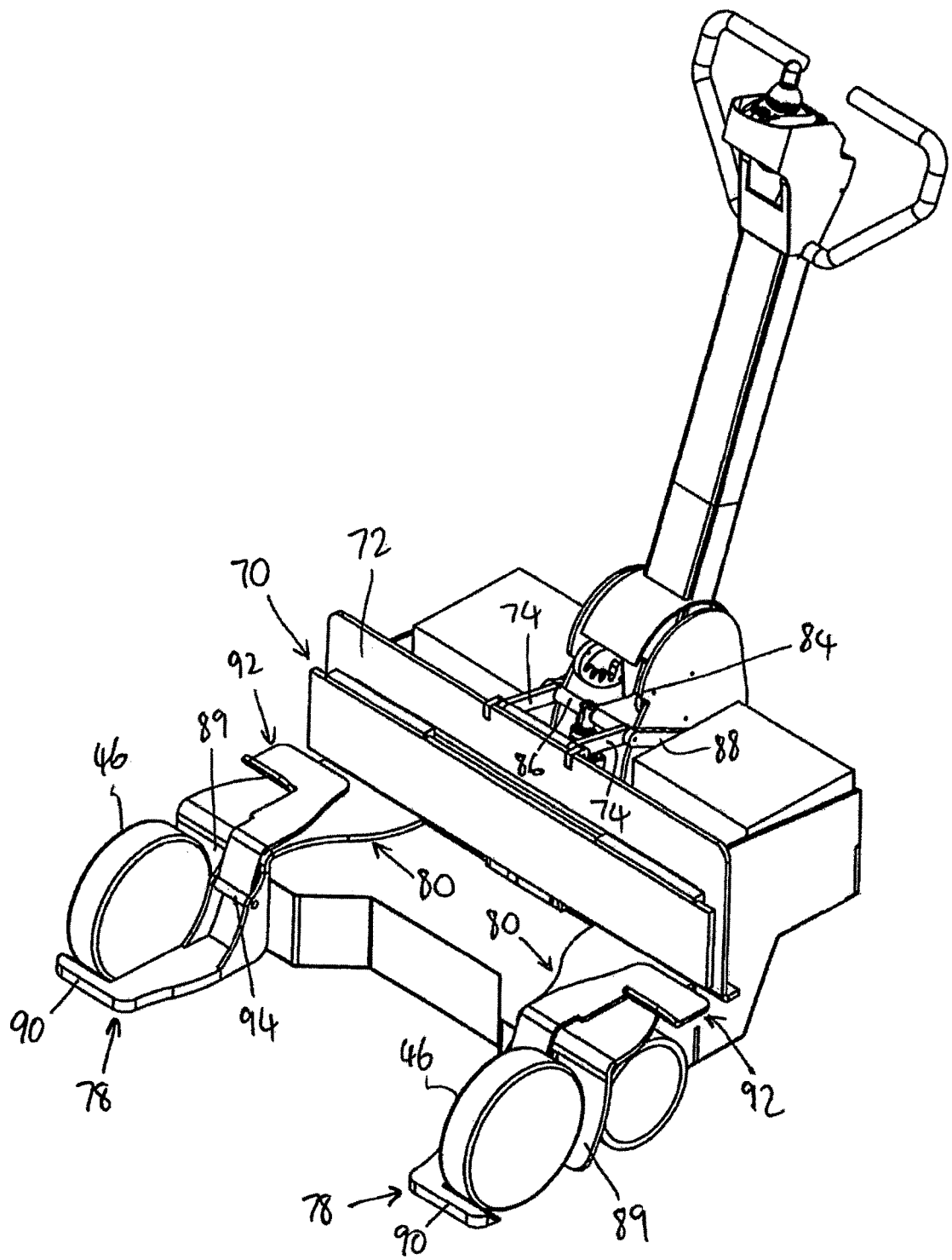
FIG. 16 illustrates a front, top perspective view of a lifting and transporting device in accordance with a third embodiment of the present invention.
Figure 17:
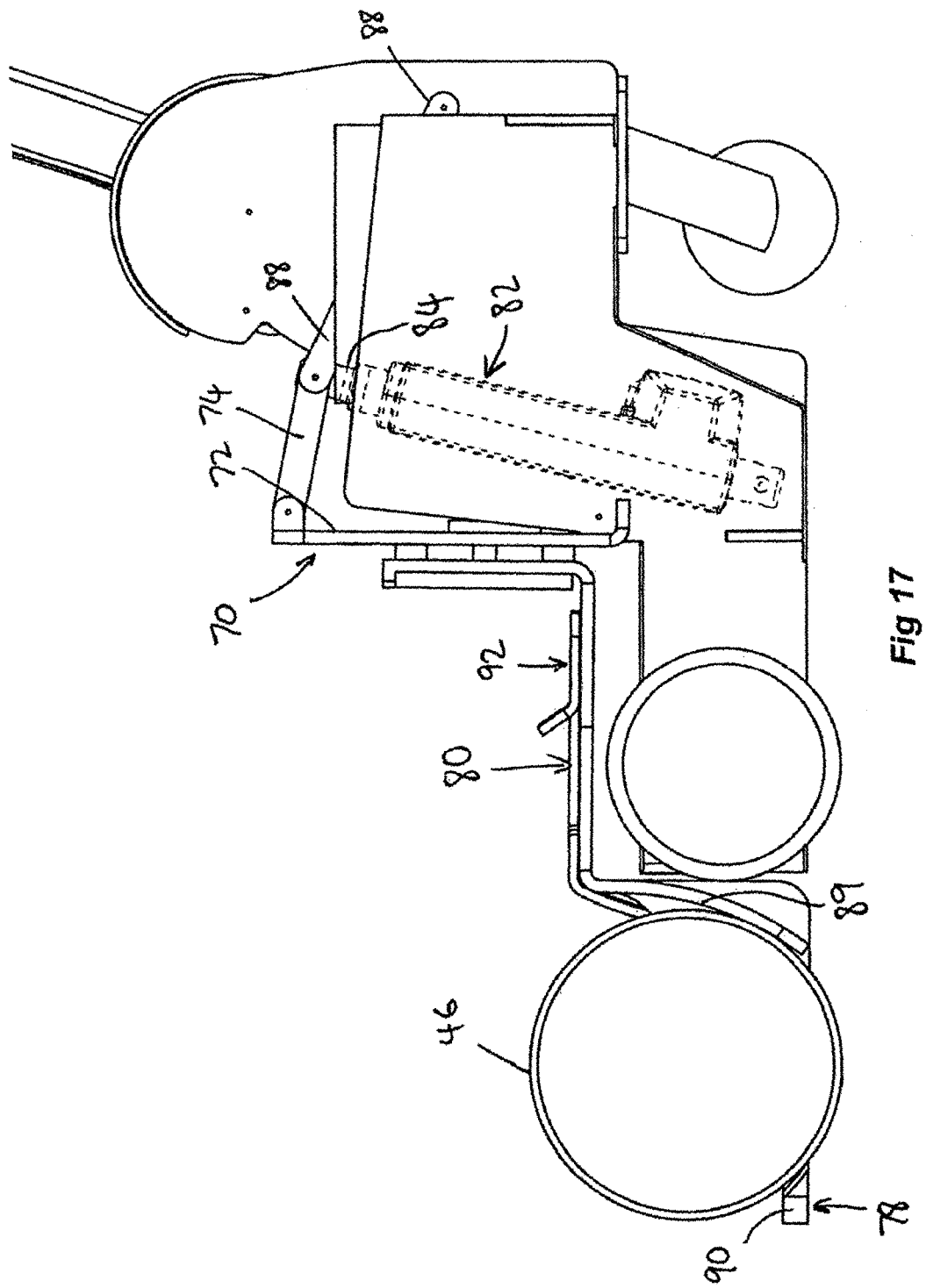
FIG. 17 illustrates an enlarged side view of the lifting and transporting device of FIG. 16 including a perforated outline of how the cylinder is orientated behind the side plate.
Figure 18:
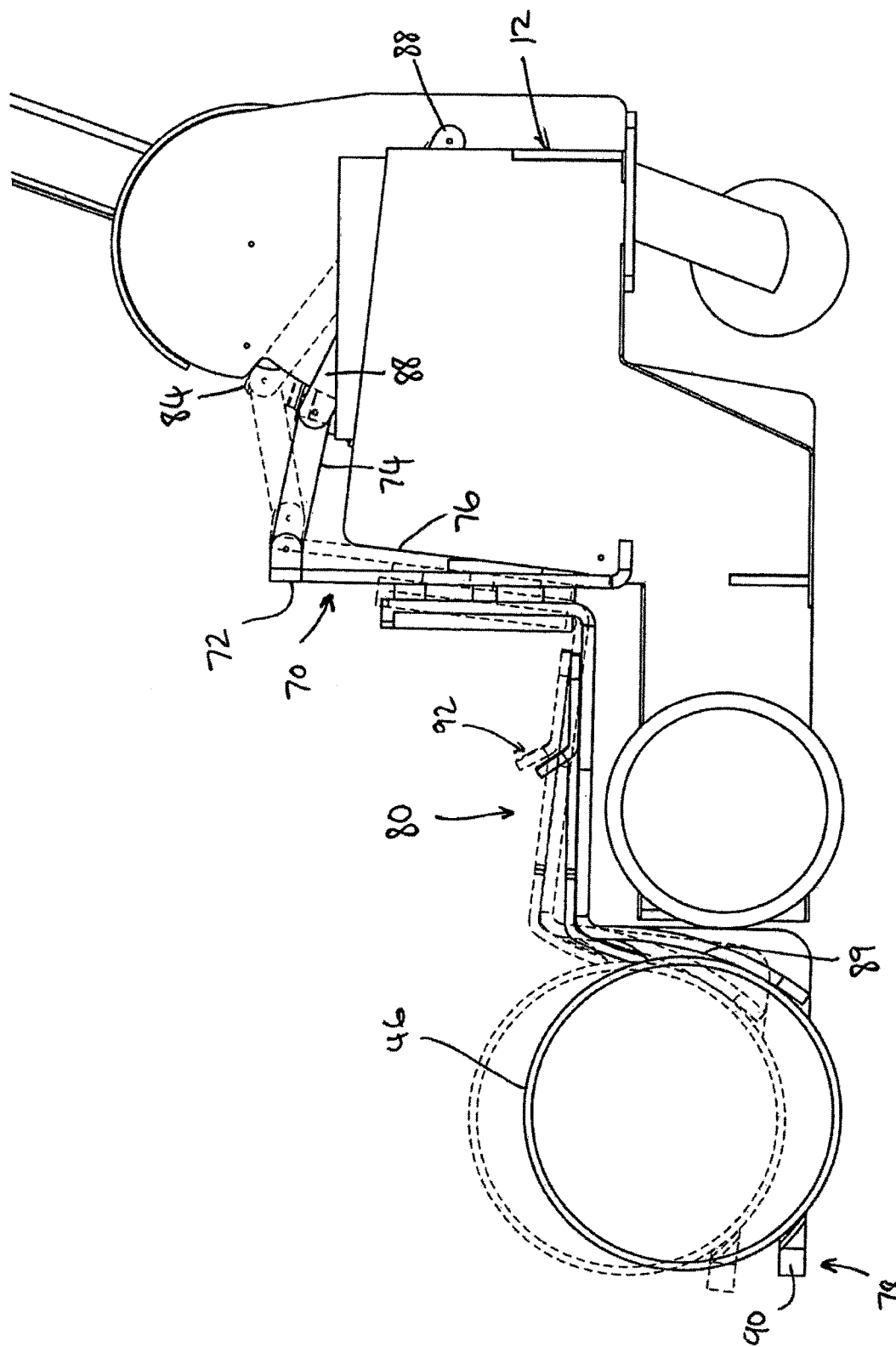
FIG. 18 illustrates an enlarged side view of the lifting and transporting device of FIG. 16 with rear wheels of a hospital bed engaged by jaws in their lowered position, and a perforated outline of components when the jaws are in their raised position.

A third embodiment of the present invention is illustrated in FIGS. 16-18 and demonstrates yet another mechanism for engaging and lifting bed wheels off the ground while still utilising transverse movement of jaws to engage bed wheels in accordance with the present invention. Only the fundamental differences between this and the second embodiment will be described, that is, the differences which affect the operation of lifting and transporting the bed.

Device 200 includes a frame 202, an engaging/lifting attachment 204 and jaws 206 associated therewith. This embodiment demonstrates how the jaws 206 can be configured to engage bed wheels 208 by outward transverse movement rather than inward movement as per the first two embodiments. The jaws 206 and the way in which they may be configured to accept different wheel diameters are described further below.

The engaging/lifting attachment 204 includes an elongate plate 210 extending across the front of the device. The plate 210 is pivotably supported along its top edge by a pair of rearwardly extending rods 212 and also pivotably supported at its lower edge by way of pivotal connection to the frame 202. There is a rearwardly angled abutment surface 214 associated with the frame 202 positioned behind the plate 210 which defines the maximum extent to which plate 206 is able to rotate in the rearwards direction. It will become apparent that when the plate 206 is rotated towards the abutment surface 210, the jaws 206 will also be upwardly and rearwardly rotated to thereby lift the bed wheels off the ground.

Moveable along the plate 210 are two rail assemblies 216 to which are fixed the jaws 206 responsible for engaging the bed wheels. Once again, each rail assembly 206 extends forwardly from the plate 210 to a position beyond the frame 202 and wheels with each jaw 206 then extending still further forwards from the respective rail assemblies such that a lower limb of each jaw is generally level with the ground surface.

As shown most clearly in FIG. 17, the actuator 218 is positioned in an upright orientation inside the frame 202 and includes a piston 220 which at its upper end is pivotally connected to a transverse connecting rod 222 joining the rearward ends of rods 212. The connecting rod 222 is effectively a pivot pin for the rearward ends of rods 212 as well as the front ends of a further pair of rods 224 which are in turn pivotally connected to the frame 202.

At rest, the actuator 218 assumes a withdrawn position as shown in FIG. 17. As the actuator is operated the piston 220 emerges and acts against the connecting rod 222 to thereby raise the connecting rod 222. When the connecting rod 222 is raised, the rearward ends of rods 212 are also raised and, owing to their pivotable connections, the upper end of the plate 206 is drawn or tipped rearwardly until the plate abuts with the rear surface 214. FIG. 18 demonstrates this movement. Such movement is enough to ensure the jaws 206 and hence bed wheels are lifted a sufficient distance off the ground to enable transportation.

According to this embodiment, the jaws used to engage each rear bed wheel are adapted to be outwardly moveable. Each jaw 206 is accordingly of an outwardly directed, flat L-shaped structure with a forward limb 226 and rearward wall 228 that is rounded so as to have a similar contour to that of each wheel. Once the device is wheeled to the rear of a bed, the jaws can be moved outwardly until the rear wheels are secured between the forward limb 226 and the rear wall 228. The skilled addressee would realise that owing to its shape, the jaws 206 once lifted will also raise the bed wheels.

As described earlier in the first embodiment, the devices may be configured to accept wheel diameters of different diameter. In this third embodiment, the jaws 206 are suited to engage quite large diameter bed wheels. However, the jaws 206 can be altered to accommodate smaller diameter bed wheels through use of a pivotable component 230 which is shown in the drawings to pivot about pin 232. The pivotable component is shaped correspondingly with the L-shaped jaw and is adapted to sit above the jaw 206. When the component 230 sits above the jaw 206 it effectively reduces the space between the limb and rear wall and thus accommodates wheels of less diameter. The pivotable components 230 can be rotated such that they rest above the respective rail assemblies which would be their rest positions when larger diameter wheels are to be engaged.

It is to be understood that the front castors in the first embodiment, and the front wheels in the second and third embodiments, will principally take the load of the bed. Thus, in each case, the rear castor wheel is relatively free and can swivel allowing controlled movement of the bed even in confined spaces. The two powered driven wheels are preferably independently powered to effect steering of the machine and bed combination. Castor wheels at the opposite end of the bed carry the remaining weight of the bed.

The invention has been described by way of example. The examples are not, however, to be taken as limiting the scope of the invention in any way. Modifications and variations of the invention such as would be apparent to a skilled addressee are deemed to be within the scope of the invention.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A device for lifting an item or part thereof having spaced apart wheels, said device comprising:
   a main body including a first axis extending through a front and rear of said main body;
   two wheel engagement attachments associated with said main body and each configured to support a spaced apart wheel of said item during lifting, each attachment being moveable through a common mechanical driver with respect to said body along a second axis which extends substantially perpendicular to said first axis, wherein said engagement occurs when the attachments and wheels are first aligned along said second axis or an axis parallel thereto, and the attachments then moved towards respective wheels until the attachments and wheels are substantially aligned along said first axis or an axis parallel thereto, wherein each of said wheel engagement attachments has a first end and a second end;
   wherein the main body further includes a frame with a vertically movable rack attached to the frame for lifting the first ends of said wheel engagement attachments;
   means for lifting said rack; and
   a front castor wheel assembly associated with each of said wheel engagement attachments for supporting the second end of said wheel engagement attachments, wherein the front castor wheel assemblies each have a front castor wheel that remains in contact with the ground surface when the wheel engagement attachments are lifted by the rack in a direction away from the ground surface.

2. The device for lifting in claim 1 wherein each wheel engagement attachment is slidably moveable in equal and opposite directions along a guide plate attached to the rack and disposed at the front of the main body and extending along said second axis or an axis parallel thereto.

3. The device for lifting in claim 2 wherein each wheel engagement attachment is adapted to be moved to a greater spaced apart distance than the wheels before being moved inwardly towards the respective wheels for engagement thereof.

4. The device for lifting in claim 3 wherein each wheel engagement attachment includes a jaw having at least a forward and rearward wheel abutment surface.

5. The device for lifting in claim 4 wherein said jaw is open on an inner side thereof for accepting said wheel when moving there towards.

6. The device for lifting claim 4 wherein each wheel engagement attachment includes a means of adjusting the distance between said forward and rearward wheel abutment surface to accommodate wheels of different diameter.

7. The device for lifting in claim 2 wherein each wheel engagement attachment is adapted to be disposed between the wheels before being moved in an outwardly direction towards the respective wheels for engagement thereof.

8. The device for lifting in claim 7 wherein said jaw is open on an outer side thereof for accepting said wheel when moving there towards.

9. The device for lifting in claim 7 wherein each wheel engagement attachment includes a means of adjusting the distance between said forward and rearward wheel abutment surface to accommodate wheels of different diameter.

10. The device for lifting in claim 2 wherein each wheel engagement attachment is associated with a toothed rack respectively, each rack being in meshed engagement with a driven spur gear associated with said guide plate, whereby rotation of said spur gear in one direction causes the attachments to move away from one another at a constant rate, and rotation in the opposite direction causes the attachments to move toward one another at a constant rate.

11. In the device for lifting in claim 10 wherein when one attachment engages a first wheel before the other, one of said toothed racks stops and thereby causes the spur gear and hence second rack to continue moving towards the engaged jaw until the second wheel is engaged.

12. The device for lifting in claim 1 wherein said frame is supported above two front drive wheels and a rear steering wheel.

13. The device for lifting in claim 12 wherein the drive wheels are operated by two electric motors coupled to reduction gear boxes powered by one or more rechargeable batteries.

14. The device for lifting in claim 12 wherein the two front wheels are load-supporting.

15. The device for lifting in claim 12 wherein the front castor wheel assemblies are load-supporting.

16. The device for lifting in claim 1 wherein said item is a hospital bed having two front and two rear wheels, said two rear wheels adapted to be lifted by said device to facilitate transportation of the bed.

* * * * *